Patented Jan. 8, 1952

2,581,454

UNITED STATES PATENT OFFICE 2,581,454

SUSPENSIONS OF POLYMERIC CHLOROTRIFLUOROETHYLENE

Murray M. Sprung, Schenectady, N. Y., assignor to General Electric Company, a corporation of New York No Drawing. Application November 25, 1949, Serial No. 129,535

17 Claims. (Cl. 260—29.6)

This invention is concerned with suspensions of polymeric chlorotrifluoroethylene. More particularly, the invention relates to a suspension comprising (1) a dispersed phase of finely divided polymeric chlorotrifluoroethylene and (2) a dispersing medium comprising (a) water and (b) a water-soluble, oxygen-containing compound having a boiling point above 50° C. and selected from the class consisting of aliphatic ethers (both straight chain and cyclic), aliphatic monohydric alcohols (including halogenated, e. g., chlorinated, alcohols), aliphatic ketones, aliphatic esters, aliphatic lactones, aliphatic acetals, mixtures of monohydric saturated aliphatic alcohols and dihydric saturated aliphatic alcohols, and mixtures thereof. The invention also embraces methods for making the above-described suspensions.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in the physical characteristics or the insulating properties of the polymeric insulation. Such polymeric material is also highly desired for many applications where its high softening point is an advantage. Thus it is possible to mold various objects from the polymeric chlorotrifluoroethylene, either with or without fillers, to give useful articles which are dimensionally stable over a wide temperature range.

Because of its extreme chemical resistance and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene but these have generally been unsuccessful because the limit of solubility of the polymeric chlorotrifluoroethylene in the solvent has been so small as to render it impractical. Attempts to prepare dispersions of polymeric chlorotirfluoroethylene have also been generally unsuccessful because of the poor stability of such dispersions due apparently to the dispersing phases used.

I have now discovered that for the first time it is possible to make substantially stable suspensions of polymeric chlorotrifluoroethylene (any solid polymer thereof may be employed) using as the dispersing medium relatively inexpensive liquids. More particularly, I have discovered that I am able to make stable suspensions of polymeric chlorotrifluoroethylene by first comminuting the polymeric material, for instance, in a micropulverizer, to a fine particle size, thereafter mixing the finely divided polymer with a dispersing phase comprising water and a water soluble compound of the class described above, and finally grinding this mixture, for example, in a pebble mill or in a ball mill, for a time sufficient to yield a stable suspension. Suspensions made in accordance with my above-described methods are uniformly stable over long periods of time. In addition, even if there should be some slight settling out of the suspended polymeric material, it is possible by mere stirring, either prior to use or during use, to reinstate the suspension to its originally acceptable form.

Although some dispersions of a similar polymer, polymeric tetrafluoroethylene, have been made using other materials as a dispersing phase, nevertheless, attempts to use the same dispersing phases, with polymeric chlorotrifluoroethylene have been unsuccessful. Moreover, despite extensive investigation, dispersions made with polymeric tetrafluoroethylene, have not proved too satisfactory in many applications where my claimed suspensions have been useful. It was most surprising to find that satisfactory aqueous suspensions of polymeric chlorotrifluoroethylene could be prepared since the latter polymer is not wet by water.

In using the various members of the class of water-soluble oxygen-containing compounds mentioned above, it will be apparent to those skilled in the art that the degree of solubility of such compounds in water may be varied over wide limits, e. g., from as low as about 2%, by weight, to complete miscibility with water. I prefer that the degree of solubility of the oxygen-containing compounds in water be of the order of at least 10% on a weight basis.

The amount of water used in making the suspensions of my invention is preferably equal to from about 25 to 75 per cent by weight, based on the total weight of the ingredients in the dispersing medium. Good results are obtained when the amount of water present ranges from about 35 to 60 per cent, by weight.

Among the aliphatic ethers which may be employed in the practice of this invention may be mentioned, for example, di-isopropyl ether, di-n-butyl ether, di-isobutyl ether, di-n-propyl ether, dioxane, dimethyl dioxane, tetrahydrofurane, tetrahydropyrane, butylene oxide, 1,2-dimethoxyethane, 1,2-di-ethoxyethane, 1,2-di-n-butoxyethane, alpha-methyl-tetrahydrofurane.

Among the various esters (i. e., saturated aliphatic monohydric and dihydric alcohol esters of saturated aliphatic monocarboxylic acids) which may be used in my invention may be mentioned, for instance, various fatty acid esters, e. g., methyl acetate, ethyl acetate, ethyl propionate, isopropyl acetate, etc.; ethylene glycol diacetate, methyl acetoacetate, ethyl chloroacetate, chloroethyl acetate, ethyl dichloroacetate, beta-methoxyethyl acetate, beta-ethoxyethyl acetate, methyl lactate, etc.

Various water soluble ketones may also be employed, among which may be mentioned, for example, acetone, methyl ethyl ketone, methyl isopropyl ketone, methyl-n-propyl ketone, diacetone, diacetyl, 2,3-pentanedione, 2,4-pentanedione, etc.

Included among the acetals which may be employed, are, for instance, dimethyl acetal, diethyl acetal, 1,3-dioxolane, 2-methyl-1,3-dioxolane, dichloromethyl formal, bis-beta-methoxyethyl formal, bis-beta-methoxyethoxyethyl formal, bis-beta-ethoxyethyl acetal.

Various lactones which may be employed in the practice of the present invention are, for example, beta-propriolactone, gamma-butyrolactone, alpha-methyl-gamma-valerolactone, beta-methyl-gamma-valerolactone, alpha-methyl-gamma-butyrolactone, beta-butyrolactone.

When using water with the mixture of saturated monohydric aliphatic alcohol and saturated aliphatic dihydric alcohol, I have found that the amount of monohydric alcohol and dihydric alcohol may be varied within substantially wide limits. Generally, I have found that the liquid monohydric and dihydric alcohols are each advantageously present in an amount equal to from about 3 to 72 per cent, by weight, based on the total weight of the constituents in the dispersing medium. A range of proportions of water, monohydric alcohol, and dihydric alcohol which I have found suitable in the practice of my invention is disclosed in the table below, wherein are found both representative broad ranges of ingredients and preferred ranges which have been found to be eminently suitable.

TABLE I

|  | Broad Range, Per Cent By Weight | Preferred Range, Per Cent By Weight |
| --- | --- | --- |
| Water | 25–75 | 35–60 |
| Monohydric alcohol | 3–72 | 15–50 |
| Dihydric alcohol | 3–72 | 15–50 |

The foregoing per cents of ingredients are intended to add up to 100%.

In order that those skilled in the art may better understand how the present invention may be practiced, the following examples are given by way of illustration and not by way of limitation.

*Example 1*

In this example, polymeric chlorotrifluoroethylene (no strength temperature of 305° C.) was ground in a micropulverizer until the average particle size of the polymer was from about 0.2–25 microns. Thereafter this polymer was mixed with ingredients comprising the dispersing phase disclosed below in Table II comprising water, a monohydric alcohol, and a dihydric alcohol in the stipulated proportions and placed in a ball mill and milled for the stated period of time.

TABLE II

| Sample No. | Weight of Ground Polymer, Grams | Dispersing Phase | Volume of Dispersing Phase Component, ml. | Milling Time, Days |
| --- | --- | --- | --- | --- |
| 1 | 50 | Water<br>n-Butanol<br>Ethylene glycol | 80<br>80<br>80 | 6 |
| 2 | 100 | Water<br>n-Butanol<br>Ethylene glycol | 200<br>200<br>200 | 8 |
| 3 | 75 | Water<br>n-Butanol<br>Ethylene glycol | 150<br>75<br>75 | 7 |
| 4 | 75 | Water<br>n-Butanol<br>2-Methyl-2,4-pentanediol | 175<br>87.5<br>87.5 | 7 |
| 5 | 75 | Water<br>Butyl Cellosolve<br>2-Methyl-2,4-pentanediol | 150<br>75<br>75 | 5 |
| 6 | 75 | Water<br>t-Amyl alcohol<br>2-Methyl-2,4-pentanediol | 150<br>75<br>75 | 5 |
| 7 | 75 | Water<br>t-Amyl alcohol<br>2-Methyl-2,4-pentanediol | 195<br>52.5<br>52.5 | 5 |
| 8 | 75 | Water<br>t-Amyl alcohol<br>2-Methyl-2,4-pentanediol | 150<br>75<br>75 | 5 |
| 9 | 300 | Water<br>t-Amyl alcohol<br>2-Methyl-2,4-pentanediol | 600<br>300<br>300 | 4 |
| 10 | 75 | Water<br>n-Butanol<br>2-Methyl-2,4-pentanediol | 150<br>75<br>75 | 3 |
| 11 | 75 | Water<br>n-Butanol<br>2-Methyl-2,4-pentanediol | 150<br>75<br>75 | 6 |

All the foregoing prepared suspensions were quite stable over long periods of time. In order to test their effectiveness as coating agents, each of the above-described suspensions was applied to a thin copper wire by passing the latter through the respective suspension and up through a heated vertical baking oven maintained at a maximum air temperature of between about 300° and 450° C. No swelling or solution of the polymer was noted. Thereafter, each coated wire was immersed in a salt water bath while a current was applied to the conductor to determine whether the surface insulation was continuous. Table III shows the results of such tests, together with results of abrasion tests conducted on a coated insulator using the abrasion method and tester described in Flynn et al. application Serial No. 54,636, filed October 15, 1948, and assigned to the same assignee as the present invention.

TABLE III

| Sample No. | Increase in Diameter, Mils | Abrasion Scrapes [1] | Remarks |
| --- | --- | --- | --- |
| 1 | 2.3–2.5 | 25 (430 gram weight) | Clear, smooth, brassy-colored insulated wire supporting current in salt water. |
| 2 | 2.1–2.5 | 13–33 (430 gram weight) | Clear, smooth, brassy-colored insulated wire supporting current in salt water. |

TABLE III—Continued

| Sample No. | Increase in Diameter, Mils | Abrasion Scrapes [1] | Remarks |
|---|---|---|---|
| 3 | 1.5–2.5 | 5–38 (430 gram weight) | Clear, brassy color; supports current in salt water. |
| 4 | 2.1–3.0 | 8–47 (620 gram weight) | Supported current in salt water. |
| 5 | 1.5–2.1 | 3–16 (430 gram weight) | Clear, bright wire supporting current in salt water. |
| 7 | 1.2–3.0 | 3–13 (620 gram weight) | Smooth, clear insulation supporting current in tap water. |
| 8 | 2.0–3.0 | 1–9 (620 gram weight) | (Smooth, bright. Infinite resistance in salt water. |
| 9 | 1.5–2.0 | 1–8 | Conductor comprising aluminum wire. Coating was colorless and supported current in salt water. |
| 10 | 1.7–2.5 | 9–13 | Aluminum wire employed. Coating clear and supported current. |
| 11 | 1.5–2.1 | 3–15 | Very smooth, well-fused coating in which most of the sample supported current in salt water. |

[1] Conducted on at least 5 samples.

Example 2

In this example, suspensions of polymeric chlorotrifluoroethylene were prepared using a mixture of water and a water-soluble, oxygen-containing compound having a boiling point above 50° C., other than those employed in Example 1, and more particularly described in the first paragraph of this specification. The procedure in each case was the same as that followed in preparing the suspensions in Example 1.

The following table shows the weight and volume relationship of the ingredients, together with the particular dispersing phase components employed.

TABLE IV

| Sample No. | Weight of Ground Polymer, Grams | Dispersing Phase | Volume of Dispersing Phase Component, ml. | Milling Time, Hours |
|---|---|---|---|---|
| 12 | 15 | Water / Dioxane | 85 / 415 | 16 |
| 13 | 15 | Water / Dioxane | 250 / 250 | 16 |
| 14 | 15 | Water / Methyl Cellosolve acetal [1] | 100 / 400 | 16 |
| 15 | 15 | Water / Methyl Cellosolve acetal | 167 / 333 | 16 |
| 16 | 15 | Water / Methyl Cellosolve acetal | 250 / 250 | 16 |
| 17 | 50 | Water / Ethyl lactate | 500 / 500 | 16 |
| 18 | 50 | Water / Ethylene chlorohydrin | 500 / 500 | 16 |
| 19 | 50 | Water / gama-Valero-lactone | 500 / 500 | 16 |
| 20 | 50 | Water / tertiary-Amyl alcohol | 500 / 500 | 16 |
| 21 | 50 | Water / Acetonyl acetone | 500 / 500 | 16 |
| 22 | 50 | Water / Methyl ethyl ketone | 500 / 500 | 16 |
| 23 | 50 | Water / Methyl ethyl ketone / Ethylene glycol | 500 / 300 / 200 | 18 |
| 24 | 50 | Water / Ethylene chlorohydrin / Ethylene glycol | 300 / 500 / 200 | 18 |
| 25 | 50 | Water / Ethyl lactate / Ethylene glycol | 500 / 300 / 200 | 18 |
| 26 | 50 | Water / tertiary-Amyl alcohol / 2-Methyl-2,4-pentanediol | 500 / 250 / 250 | 18 |
| 27 | 50 | Water / Diacetone alcohol | 500 / 500 | 22.5 |
| 28 | 50 | Water / Tetrahydrofurfuryl alcohol | 500 / 500 | 22.5 |
| 29 | 50 | Water / Ethyl acetoacetate | 500 / 500 | 22.5 |
| 30 | 50 | Water / Isobutylene chlorohydrin / Ethylene glycol | 435 / 435 / 130 | 16.5 |
| 31 | 50 | Water / alpha,alpha'-Dichlorohydrin [2] / Ethylene glycol | 357 / 357 / 286 | 16.5 |
| 32 | 50 | Water / Ethylene chlorohydrin | 750 / 250 | 70 |
| 33 | 50 | Water / Ethylene chlorohydrin | 500 / 500 | 70 |
| 34 | 50 | Water / Ethylene chlorohydrin | 250 / 750 | 70 |
| 35 | 50 | Water / alpha,alpha'-Dichlorohydrin | 750 / 250 | 70 |
| 36 | 50 | Water / alpha,alpha'-Dichlorohydrin | 500 / 500 | 70 |
| 37 | 50 | Water / alpha,alpha'-Dichlorohydrin | 250 / 750 | 70 |
| 38 | 50 | Water / Ethylene chlorohydrin / Ethylene glycol | 652 / 218 / 130 | 70 |
| 39 | 50 | Water / Ethylene chlorohydrin / Ethylene glycol | 435 / 435 / 130 | 70 |
| 40 | 50 | Water / Ethylene chlorohydrin / Ethylene glycol | 218 / 652 / 130 | 70 |

[1] Bis-beta-methoxyethyl acetal.
[2] 1,3-dichloro-2-propanol.

Additional samples of some of the above suspensions were prepared and used to coat copper wire employing the same procedure as used in Example 1. In some cases, a minor proportion of pigment was added to the suspension. The following table shows the additional samples of suspensions prepared for coating the copper wire.

TABLE V

| Sample No. | Weight of Ground Polymer, Grams | Dispersing Phase | Volume of Dispersing Phase Components, ml. | Milling Time, Hours |
|---|---|---|---|---|
| 41 | 75 | Water / tertiary-Amyl alcohol / 2-Methyl-2,4-pentanediol | 100 / 50 / 50 | 140 |
| 42 | a 60 | Water / tertiary-Amyl Alcohol / 2-Methyl-2,4-pentanediol | 200 / 100 / 100 | 168 |
| 43 | b 60 | Water / tertiary-Amyl alcohol / 2-Methyl-2,4-pentanediol | 175 / 87.5 / 87.5 | 50 | a This sample contained 24 grams of bentonite interspersed throughout the suspension.
b This sample contained 10 grams of catalpa clay interspersed throughout the suspension.

Copper wire coated with suspensions made using Sample Nos. 41, 42 and 43 were found to have uniform, flexible, continuous coatings.

It will, of course, be apparent to those skilled in the art that in addition to the concentrations of polymer described above, other concentrations of polymeric chlorotrifluoroethylene may also be employed without departing from the scope of the invention. Thus I may use an amount of polymer ranging, by weight, from about 1 to 50 per cent, preferably from 5 to 30 per cent, of the total weight of the polymer and the dispersing phase.

In addition to the monohydric alcohols employed in the above examples, other liquid monohydric alcohols, especially saturated aliphatic monohydric alcohols, preferably containing at least three carbon atoms, may also be employed. Among such alcohols may be mentioned, for instance, n-propyl alcohol, isopropyl alcohol, n-pentanol, t-butyl alcohol, 2-methyl butanol, 3-methyl-2-butanol, etc.; ether monohydric alcohols, e. g., β-ethoxyethanol, β-propoxyethanol, β-methoxyethoxyethanol, β-ethoxyethoxyethanol, etc. I prefer to use a liquid monohydric saturated aliphatic alcohol having a boiling point above 50° C., e. g., around 100° C. or higher.

Among the liquid aliphatic dihydric alcohols which may be employed in addition to those used in the foregoing examples may be mentioned, for instance, trimethylene glycol, propylene glycol, 1,2-butylene glycol, 1,3-butylene glycol, 2,3-butylene glycol, tetramethylene glycol, diethylene glycol, dipropylene glycol, 2-ethyl-2,4-pentanediol. Although trihydric alcohols may be employed, nevertheless I have found it more advantageous to confine my invention to the use of dihydric alcohols. The ratio of diol to monol may be as high as 5:1 or as low as 1:5. In some cases, where sparingly soluble alcohols are involved, the practical limits are set by the limits of miscibility of the three components involved in the dispersing phase.

In general, it is desirable to grind the pulverized solid polymer with the liquid mixture of water and oxygen-containing compound in a ball mill for several days. However, for purposes of successful application to magnet wire it may not be necessary to grind for more than 24–72 hours, provided the original polymer has been reduced to the order of magnitude of at least 0.2–25 microns average particle size before grinding. No heating is necessary at any time for making the suspensions. The time required for ball-mill grinding to give a satisfactory stable suspension may range from about one-half to 15 days or more, and advantageously, in the case of the examples described above, from about 1 to 8 days.

The suspensions of polymeric chlorotrifluoroethylene described above may be employed in various ways. They may be used for coating and impregnating various fillers, such as, for example, glass cloth, glass batting, asbestos cloth, mica, etc. If desired, the suspensions may be advantageously employed in making molding compositions by adding to the suspension various inert inorganic fillers to obtain a homogeneous mixture and thereafter removing the water and oxygen-containing component of the dispersing phase from the mixture. Laminated products may also be prepared by coating and impregnating sheet material and superposing layers of the impregnated and coated material and pressing the total assembly under heat and pressure to obtain fusing of the polymer and to give a homogeneous article. In some coating applications as, for instance, in the coating of electrical conductors such as magnet wire, it has been found advantageous to add varying amounts, for example, from one to ten per cent, by weight, of a finely ground pigment or filler to the suspensions. Among such pigments and fillers which may be employed are, for example, catalpa clay, bentonite, mica dust, titanium dioxide, silica, lead silicate, lead titanate, etc.

What I claim as new and desire to secure by Letters Patent of the United States is:

1. A liquid suspension comprising (1) a dispersed phase comprising finely divided polychlorotrifluoroethylene as the sole polymeric ingredient and (2) a dispersing medium for (1) comprising (a) water and (b) a water-soluble, oxygen-containing compound having a boiling point above 50° C. and selected from the class consisting of aliphatic ethers, saturated, aliphatic, monohydric alcohols, aliphatic ketones, aliphatic esters, mixtures of monohydric, saturated aliphatic alcohols and dihydric saturated, aliphatic alcohols, and mixtures thereof.

2. A liquid suspension comprising (1) a dispersed phase comprising finely divided polychlorotrifluoroethylene as the sole polymeric ingredient and (2) a dispersing medium for (1) comprising (a) water and (b) a water-soluble, saturated, aliphatic, monohydric alcohol having a boiling point above 50° C.

3. A liquid suspension comprising (1) a dispersed phase comprising finely divided polychlorotrifluoroethylene as the sole polymeric ingredient and (2) a dispersing medium for (1) comprising (a) water and (b) a water-soluble, aliphatic ether having a boiling point above 50° C.

4. A liquid suspension comprising (1) a dispersed phase comprising finely divided polychlorotrifluoroethylene as the sole poylmeric ingredient and (2) a dispersing medium for (1) comprising (a) water and (b) a mixture of a water-soluble, monohydric, saturated, aliphatic alcohol and a dihydric aliphatic alcohol having a boiling point above 50° C.

5. A liquid suspension comprising (1) a dispersed phase comprising finely divided polychlorotrifluoroethylene as the sole polymeric ingredient and (2) a dispersing medium for (1) comprising (a) water and (b) t-amyl alcohol.

6. A liquid suspension comprising (1) a dispersed phase comprising finely divided polychlorotrifluoroethylene as the sole polymeric ingredient and (2) a dispersing medium for (1) comprising (a) water and (b) a mixture of t-amyl alcohol and 2-methyl-2,4-pentanediol.

7. A liquid suspension comprising (1) a dispersed phase comprising finely divided polychlorotrifluoroethylene as the sole polymeric ingredient and (2) a dispersing medium for (1) comprising (a) water and (b) bis-beta-methoxyethyl acetal.

8. A liquid suspension comprising (1) a dispersed phase comprising a finely divided polychlorotrifluoroethylene as the sole polymeric ingredient and (2) a dispersing medium for (1) comprising (a) water and (b) dioxane.

9. A liquid suspension comprising (1) a dispersed phase comprising a finely divided pigment and finely divided polychlorotrifluoroethylene as the sole polymeric ingredient and (2) a dispersing medium for (1) comprising (a) water and (b) a water-soluble, oxygen-containing compound having a boiling point above 50° C. and selected from the class consisting of aliphatic ethers, saturated, aliphtaic, monohydric alcohols, aliphatic ketones, aliphatic esters, mixtures of monohydric, saturated, aliphatic alcohols and saturated, dihydric, aliphatic alcohols, and mixtures of the foregoing ingredients.

10. The method of preparing liquid suspensions having good stability, which method comprises forming a mixture of ingredients comprising (1) finely divided polychlorotrifluoroethylene as the sole polymeric ingredient and (2) a mixture of ingredients comprising (a) water and (b) a water-soluble, oxygen-containing compound having a boiling point above 50° C. and selected from the class consisting of aliphatic ethers, saturated aliphatic monohydric alcohols, aliphatic ketones, aliphatic esters, mixtures of monohydric, saturated, aliphatic alcohols and saturated dihydric, aliphatic alcohols, and mixtures thereof, and grinding the mixture of ingredients for a period of time sufficient to form a stable suspension.

11. The method of preparing liquid dispersions having a good stability, which method comprises forming a mixture of ingredients comprising (1) finely divided polychlorotrifluoroethylene as the sole polymeric ingredient and (2) a mixture of ingredients comprising (a) water and (b) a water-soluble, saturated, aliphatic ether having a boiling point above 50° C., and grinding the mixture of ingredients for a period of time sufficient to form a stable suspension.

12. The method of preparing liquid suspensions having good stability, which method comprises forming a mixture of ingredients comprising (1) finely divided polychlorotrifluoroethylene as the sole polymeric ingredient, and (2) a mixture of ingredients comprising (a) water and (b) a water-soluble, saturated, aliphatic, monohydric alcohol having a boiling point above 50° C., and grinding the mixture of ingredients for a period of time sufficient to form a stable suspension.

13. The method of preparing liquid suspensions having good stability, which method comprises forming a mixture of ingredients comprising (1) finely divided polychlorotrifluoroethylene as the sole polymeric ingredient and (2) a mixture of ingredients comprising (a) water and (b) t-amyl alcohol, and grinding the mixture of ingredients for a period of time sufficient to form a stable suspension.

14. The method of preparing liquid suspensions having good stability, which method comprises forming a mixture of ingredients comprising (1) finely divided polychlorotrifluoroethylene as the sole polymeric ingredient and (2) a mixture of ingredients comprising (a) water and (b) dioxane, and grinding the mixture of ingredients for a period of time sufficient to form a stable suspension.

15. The method of preparing liquid dispersions having good stability, which method comprises forming a mixture of ingredients comprising (1) finely divided polychlorotrifluoroethylene as the sole polymeric ingredient and (2) a mixture of ingredients comprising (a) water and (b) bis-beta-methoxyethyl acetal, and grinding the mixture of ingredients for a period of time sufficient to form a stable suspension.

16. The method of preparing liquid suspensions having good stability, which method comprises forming a mixture of ingredients comprising (1) finely divided polychlorotrifluoroethylene as the sole polymeric ingredient and (2) a mixture of ingredients comprising (a) water and (b) a mixture of t-amyl alcohol and 2-methyl-2,4-pentanediol, and grinding the mixture of ingredients for a period of time sufficient to form a stable suspension.

17. The method of preparing liquid suspensions having good stability, which method comprises forming a mixture of ingredients comprising (1) finely divided polychlorotrifluoroethylene as the sole polymeric ingredient and (2) a mixture of ingredients comprising (a) water and (b) an oxygen-containing, water-soluble compound having a boiling point above 50° C. and selected from the class consisting of aliphatic ethers, saturated, aliphatic, monohydric alcohols, aliphatic ketones, aliphatic esters, mixtures of monohydric, saturated, aliphatic alcohols and saturated dihydric, aliphatic alcohols, and mixtures thereof, and (c) a finely divided pigment, and grinding the mixture of ingredients for a period of time sufficient to form a stable suspension.

MURRAY M. SPRUNG.

REFERENCES CITED

The following references are of record in the file of this patent:

UNITED STATES PATENTS

| Number | Name | Date |
|---|---|---|
| 2,393,967 | Brubaker | Feb. 5, 1946 |
| 2,412,960 | Berry | Dec. 24, 1946 |
| 2,448,952 | Berry | Sept. 7, 1948 |
| 2,484,483 | Berry | Oct. 11, 1949 |

OTHER REFERENCES

Bennett Concise Chemical and Technical Dictionary, pub., 1947, Chemical Pub. Co., New York, New York, pages 372 and 541.